United States Patent
Zavesky et al.

(10) Patent No.: US 11,157,845 B2
(45) Date of Patent: Oct. 26, 2021

(54) DEVIATIONS FROM WORKFLOWS ASSOCIATED WITH PHYSICAL ITEMS

(71) Applicant: AT&T Intellectual Property I, L.P., Atlanta, GA (US)

(72) Inventors: Eric Zavesky, Austin, TX (US); Lee Begeja, Gillette, NJ (US); Zhu Liu, Marlboro, NJ (US); Behzad Shahraray, Holmdel, NJ (US); Bernard S. Renger, New Providence, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 507 days.

(21) Appl. No.: 15/941,415

(22) Filed: Mar. 30, 2018

(65) Prior Publication Data
US 2019/0303837 A1  Oct. 3, 2019

(51) Int. Cl.
*G06Q 10/06* (2012.01)
*G06F 16/9535* (2019.01)

(52) U.S. Cl.
CPC . *G06Q 10/063114* (2013.01); *G06F 16/9535* (2019.01); *G06Q 10/06316* (2013.01)

(58) Field of Classification Search
CPC ...... G06Q 10/063114; G06Q 10/06316; G06F 16/9535
See application file for complete search history.

(56) References Cited

U.S. PATENT DOCUMENTS

| | | | |
|---|---|---|---|
| 8,694,355 B2 | 4/2014 | Bui et al. | |
| 9,009,725 B2 | 4/2015 | Biondi et al. | |
| 9,811,438 B1 | 11/2017 | Barrett et al. | |
| 9,911,100 B1* | 3/2018 | Cohen | G06Q 10/06 |
| 2006/0059253 A1* | 3/2006 | Goodman | G06Q 10/06 709/223 |
| 2007/0011334 A1* | 1/2007 | Higgins | G06F 8/34 709/227 |
| 2011/0320240 A1 | 12/2011 | Flores et al. | |
| 2014/0081691 A1 | 3/2014 | Wendell | |

(Continued)

FOREIGN PATENT DOCUMENTS

CN       105741042 A       7/2016

OTHER PUBLICATIONS

"Integration Machine Learning and Workflow Management to Support Acquisition and Adaptation of Workflow Models", by Joachim Herbstand Dimitris Karagiannis, International Journal of Intelligent Systems in Accounting, Finance & Management, John Wiley * Sons, Ltd. Feb. 2000 (Year: 2000).*

(Continued)

*Primary Examiner* — Pan G Choy

(57) ABSTRACT

Devices, computer-readable media, and methods for detecting a deviation from a workflow associated with a physical item. For example, a method may include a processing system having at least one processor for capturing a plurality of images of at least one physical item during a performance of a workflow comprising a plurality of tasks relating to the at least one physical item, tracking a progression of the performance of the workflow, and detecting, from at least a first image of the plurality of images, a deviation from the workflow. The processing system may then present a notification of the deviation from the workflow and confirm an action in response to the notification.

20 Claims, 4 Drawing Sheets

(56) References Cited

U.S. PATENT DOCUMENTS

| | | | |
|---|---|---|---|
| 2014/0222521 A1 | 7/2014 | Chait | |
| 2016/0162819 A1 | 6/2016 | Hakman et al. | |
| 2016/0186531 A1 | 6/2016 | Harkless et al. | |
| 2016/0342903 A1 | 11/2016 | Shumpert | |
| 2017/0076246 A1 | 3/2017 | Volkov et al. | |
| 2018/0247024 A1* | 8/2018 | Divine | G06K 9/00671 |
| 2019/0035047 A1* | 1/2019 | Lim | G06T 1/20 |

OTHER PUBLICATIONS

"Engineering and Development of Cooperative Information Systems", by Yanbo Han, Stefan Tai, and Dietmar Wikarski, First International Conference, EDCIS 2002, Beijing, China, Sep. 17-20, 2002 Proceedings, Springer. (Year: 2002).*

"Deep Neural Network for Structural Prediction and Lane Detection in Traffic Scene", by Jun Li, Xue Mei and Danil Prokhorov, Senior Member, IEEE, and Dacheng Tao, Fellow, IEEE, IEEE Transactions on Neural Networks and Learning Systems, vol. 28, No. 3, Mar. 2017. (Year: 2017).*

* cited by examiner

DEVIATIONS FROM WORKFLOWS ASSOCIATED WITH PHYSICAL ITEMS

The present disclosure relates generally to repair, configuration, installation, and assembly of physical items, and more particularly to methods, computer-readable media, and devices for detecting a deviation from a workflow associated with a physical item.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
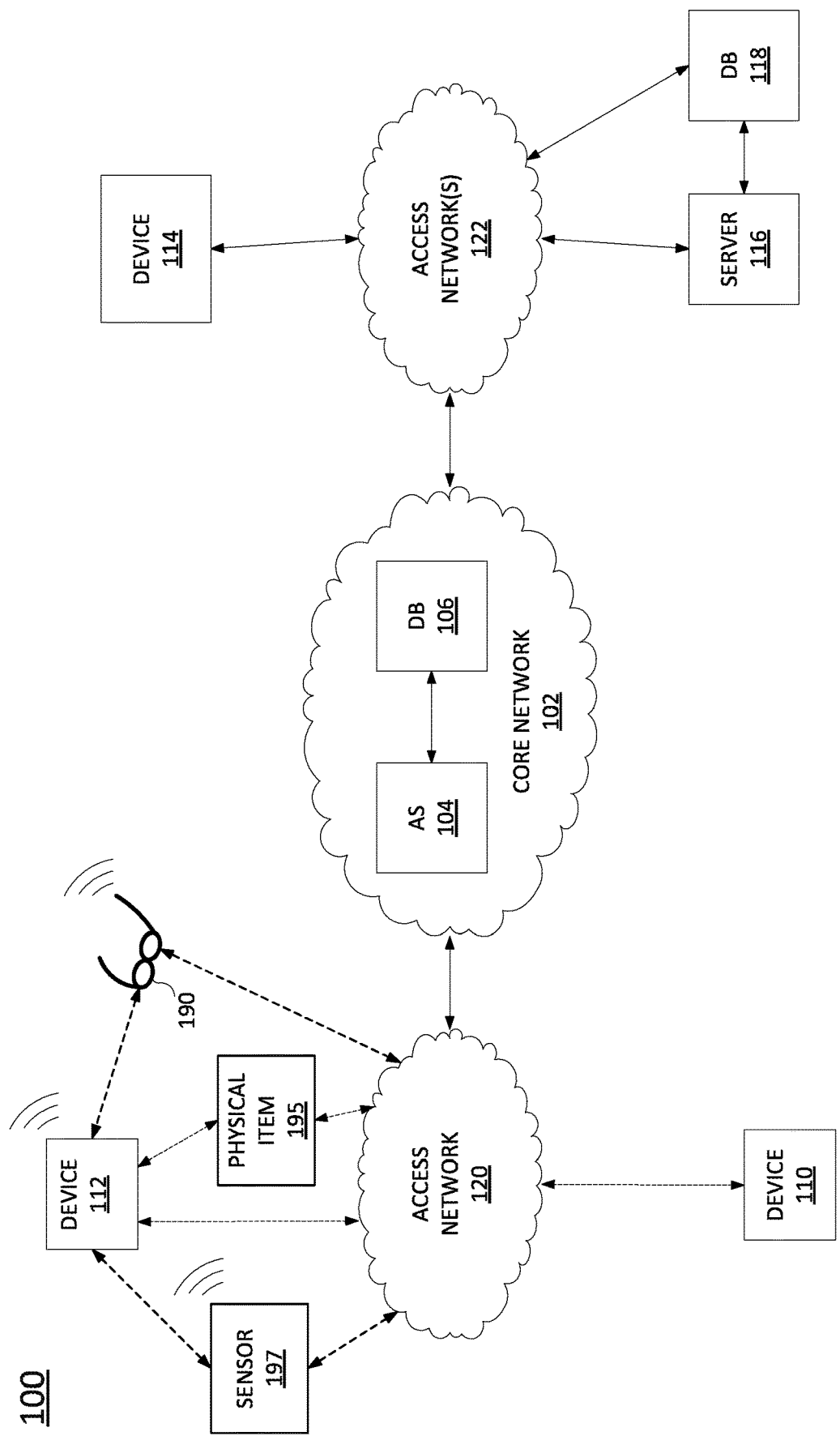
FIG. 1 illustrates an example network related to the present disclosure.

In one example, the present disclosure describes a method, computer-readable medium, and device for detecting a deviation from a workflow associated with a physical item. For instance, in one example, a method may include a processing system having at least one processor capturing a plurality of images of at least one physical item during a performance of a workflow comprising a plurality of tasks relating to the at least one physical item, tracking a progression of the performance of the workflow, and detecting, from at least a first of the plurality of images, a deviation from the workflow. The processing system may then present a notification of the deviation from the workflow and confirm an action in response to the notification.

Examples of the present disclosure provide a system that may automatically generate a workflow by learning a process from one or more experts. Such a system may aggregate tasks of a process from different experts and different users to iteratively build up a catalog of solutions and make the workflows available to assist future users. In one example, a user may query the system to obtain a workflow either by repeating one or more parts of the process (e.g., the workflow) or by direct querying via search terms to match an existing workflow to the user's task. The system may also offer suggestions for solutions or partial information along the way.

In one example, workflows are organically created and revised, in contrast to rigid manually created rule-based methods and procedures documents. Examples of the present disclosure also provide a machine learning/artificial intelligence agent to assist in digitization of a process through suggestions and statistical norms. In particular, accurate workflows are created for different repeated use cases by standardization against the statistical norms.

Examples of the present disclosure also provide faster training for new employees or other users from expert actions. For instance, examples of the present disclosure reduce risk for problematic scenarios by guiding users through a standard workflow. If a deviation from the workflow is too great, the user or system can be pre-emptively stopped, or the workflow can be adapted for a new condition. For example, anomalous actions outside of a workflow may be detected, and the system may solicit reasons for the anomaly. If the user is an expert, the workflow may be adapted to account for the anomalous action, or the system may allow the user to select whether to update the workflow. If the user is not an expert, the user can be warned of the deviation from the workflow. In addition, the system may verify that the user has corrected the anomalous action and has returned to the proper execution of the workflow.

In one example, user actions may be matched to a workflow through automatic correlation of assets (physical objects) and historical actions associated with such assets. This may allow a problem to be discovered more precisely instead of needing an exhaustive search among related issues. For instance, the asset may be a vehicle, a medical device, etc., where there may be various workflows maintained by the system that are associated with these assets. In addition, various actions may be associated with tasks within such workflows, allowing the system to determine which workflow(s) may apply to the user's current intentions. In addition, examples of the present disclosure may detect a user's actions and may direct the user to different parts of a workflow instead of directly to the beginning through interactive/automated questioning and/or user-provided examples. Thus, users do not always have to start at the beginning of a workflow.

In one example, the system may collect images, video, and/or other sensor data and verify workflow task adherence via such data. To illustrate, a technician may be working on installing a router with an "always on" mode for a body-worn camera and/or microphone. In such an example, audio may be sampled continuously and checked for compliance with tasks in the workflow (e.g., describing the maintenance, insurance, or installation process of the router to a customer). In one example, video may be collected and checked to determine compliance with physical aspects of the workflow, e.g., correct execution of the task of plugging in the router, correct execution of the task of connecting the router to the network cable, etc. Anomalies may be detected (e.g., deviations from the workflow) and the technician may be automatically warned or questioned about the deviation. The technician may be helpfully reminded if the workflow is incorrect, or the technician may indicate that the workflow is purposefully being disregarded. For example, the customer may change his or her mind after the technician is already well into the installation workflow, and may request a new cable be run to a different location rather than use the terminal of an existing cable. In such case, the existing workflow may not include steps corresponding to the task of installing a new cable, or may not include steps corresponding to the task of installing a new cable after plugging in the router. In this case, the technician may be asked whether the workflow should be updated to account for a similar scenario in the future. The system may also update the workflow based upon an affirmative response from the technician. Alternatively, or in addition, the system may keep track of the deviation from the workflow and aggregate the results over many install events. If multiple install events include the same or similar deviations from the workflow, the deviation(s) may be flagged for a supervisory user to authorize the evolving of the workflow to account for the deviation (i.e., to include the deviation as part of the workflow so that it is no longer an exception).

In addition, in one example, the system may store video and/or audio of the task performance and may associate the video and/or audio with task(s) (step(s)) that may be included in an updated workflow. For subsequent jobs, other technicians may then review the video and/or audio of previous jobs where the new steps were performed. Over time, users may vote on which video and/or audio is the most helpful such that subsequent users/technicians may be preferentially provided with the video and/or audio that is deemed most useful or relevant to the particular tasks/steps in the workflow. These and other aspects of the present disclosure are described in greater detail below in connection with the examples of FIGS. 1-4.

To further aid in understanding the present disclosure, FIG. 1 illustrates an example system 100 in which examples of the present disclosure for detecting a deviation from a workflow associated with a physical item may operate. The system 100 may include any one or more types of communication networks, such as a traditional circuit switched network (e.g., a public switched telephone network (PSTN)) or a packet network such as an internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, a 5G network, and the like related to the current disclosure. It should be noted that an IP network is broadly defined as a network that uses internet Protocol to exchange data packets. Additional example IP networks include Voice over IP (VoIP) networks, Service over IP (SoIP) networks, and the like.

In one example, the system 100 may comprise a core network 102. The core network 102 may be in communication with one or more access networks 120 and 122, and the internet (not shown). In one example, core network 102 may combine core network components of a cellular network with components of a triple play service network; where triple-play services include telephone services, internet services and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an internet Protocol/Multi-Protocol Label Switching (IP/MPLS) backbone network utilizing Session Initiation Protocol (SIP) for circuit-switched and Voice over internet Protocol (VoIP) telephony services. Core network 102 may further comprise a broadcast television network, e.g., a traditional cable provider network or an internet Protocol Television (IPTV) network, as well as an internet Service Provider (ISP) network. In one example, core network 102 may include a plurality of television (TV) servers (e.g., a broadcast server, a cable head-end), a plurality of content servers, an advertising server (AS), an interactive TV/video on demand (VoD) server, and so forth. For ease of illustration, various additional elements of core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3$^{rd}$ party networks, and the like. For example, the operator of core network 102 may provide a cable television service, an IPTV service, or any other type of telecommunication service to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider. The core network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access networks 120 may be in communication with one or more devices 110, 112, and 190. In one example, access networks 120 may also be in communication with a sensor 197 and/or a physical item 195, as described further below. Similarly, access networks 122 may be in communication with one or more devices, e.g., device 114. Access networks 120 and 122 may transmit and receive communications between devices 110, 112, 190, and 114, sensor 197, and/or physical item 195, between devices 110, 112, 190, and 114, sensor 197, and/or physical item 195 and server 116, database (DB) 118, application server 104, and/or database (DB) 106, other components of core network 102, devices reachable via the internet in general, and so forth. In one example, each of devices 110, 112, 190, and 114 may comprise any single device or combination of devices that may comprise a user endpoint device. For example, the devices 110, 112, and 114 may each comprise a mobile device, a cellular smart phone, a laptop, a tablet computer, a desktop computer, an application server, a bank or cluster of such devices, and the like.

Device 190 may comprise, for example, a wearable computing device, such as a head-mounted smart camera, a pair of smart glasses, smart earbuds, and so forth. In one example, device 190 may be equipped for non-cellular wireless communication. In another example, device 190 may be equipped for cellular and non-cellular wireless communication. In one example, device 112 and device 190 may include components which support peer-to-peer and/or short range wireless communications. Thus, each of the devices 112 and 190 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth.

Devices 112 and 190 may be equipped with display screens, speakers, headsets, and the like for displaying and/or presenting communications, and for receiving inputs for interacting with such communications. For example, device 112 and/or device 190 may present images, video, audio, text instructions, or other media relating to a workflow and the tasks thereof. In addition, device 112 and/or device 190 may be equipped with one or more cameras for capturing images (including still images and/or video) from an environment. For instance, device 190 may comprise smart glasses with an outward facing camera to capture images and/or video from a field of view in a direction that a user is looking. Similarly, device 112 may comprise a smartphone or the like with a camera to capture images and/or video from a field of view in a direction that the camera is pointed. In accordance with the present disclosure, such images or video may record physical item 195 at various times in connection with a performance of a workflow relating to the physical item 195 by a user associated with device 112 and/or device 190. In one example, device 112 and/or device 190 may include additional components for capturing data from an environment, such as an acoustic sensor (or microphone), a temperature sensor (e.g., a thermometer), a Global Positioning System (GPS) unit, and so on (broadly "sensor devices"). Alternatively, or in addition, in one example, one or more sensors external to device 112 and/or device 190 may be deployed in an environment, such as sensor 197 to capture additional data such as an acoustic sensor/microphone, temperature sensor, humidity sensor, and so forth. In one example, sensor 197 and/or device 190 may communicate with devices deployed in and/or accessible via access networks 120, core network 102, and so forth via device 112. In another example, sensor data, image and/or video data may be communicated from sensor 197 and/or device 190 to access network 120, core network 102, and so forth directly via access networks 120 (e.g., without forwarding via device 112).

In one example, devices 110, 112, 190, and/or 114 may each comprise programs, logic or instructions for performing functions in connection with examples of the present disclosure for detecting a deviation from a workflow associated with a physical item. For example, devices 110, 112, 190, and 114 may each comprise a computing system or device, such as computing system 400 depicted in FIG. 4, and may be configured to provide one or more operations or functions in connection with examples of the present disclosure for detecting a deviation from a workflow associated with a physical item, as described herein.

In one example, physical item 195 may comprise a furniture item, such as a desk, a chair, a table, a bookshelf, etc., a vehicle, such as a car, a bicycle, a boat, a plane, etc., or any one or more components thereof, a toy, a model, an antenna mast, cellular base station equipment, telephony central office (CO) equipment, all or a portion of a plumbing installation or electrical wiring installation, or any other kind of physical object that may be the subject of repair, configuration, installation, assembly, or the like. In one example, physical item 195 may also comprise an electronic communication device, such as a router, a switch, a server, a mobile device, such as a cellular smart phone, a laptop, a tablet computer, a desktop computer, etc., an application server. In one example, physical item 195 may also comprise a bank or cluster of such devices, such as a data center rack installation, a network installation or a portion thereof, such as a customer premises cable installation, demarcation point extension, and so forth. Similarly, in one example, physical item 195 may comprise an electronic device for medical, industrial, or other applications, such as a magnetic resonance imaging (MRI) machine, an ultrasound machine, machinery on an assembly line, and so on. Accordingly, in one example, physical item 195 may also be equipped for wired communications, cellular and/or non-cellular wireless communication, and so forth. In addition, in one example, physical item 195 may also transmit and receive data regarding its status and configuration via access networks 120 directly, or indirectly via a connection to device 112 and/or device 190.

Figure 4:
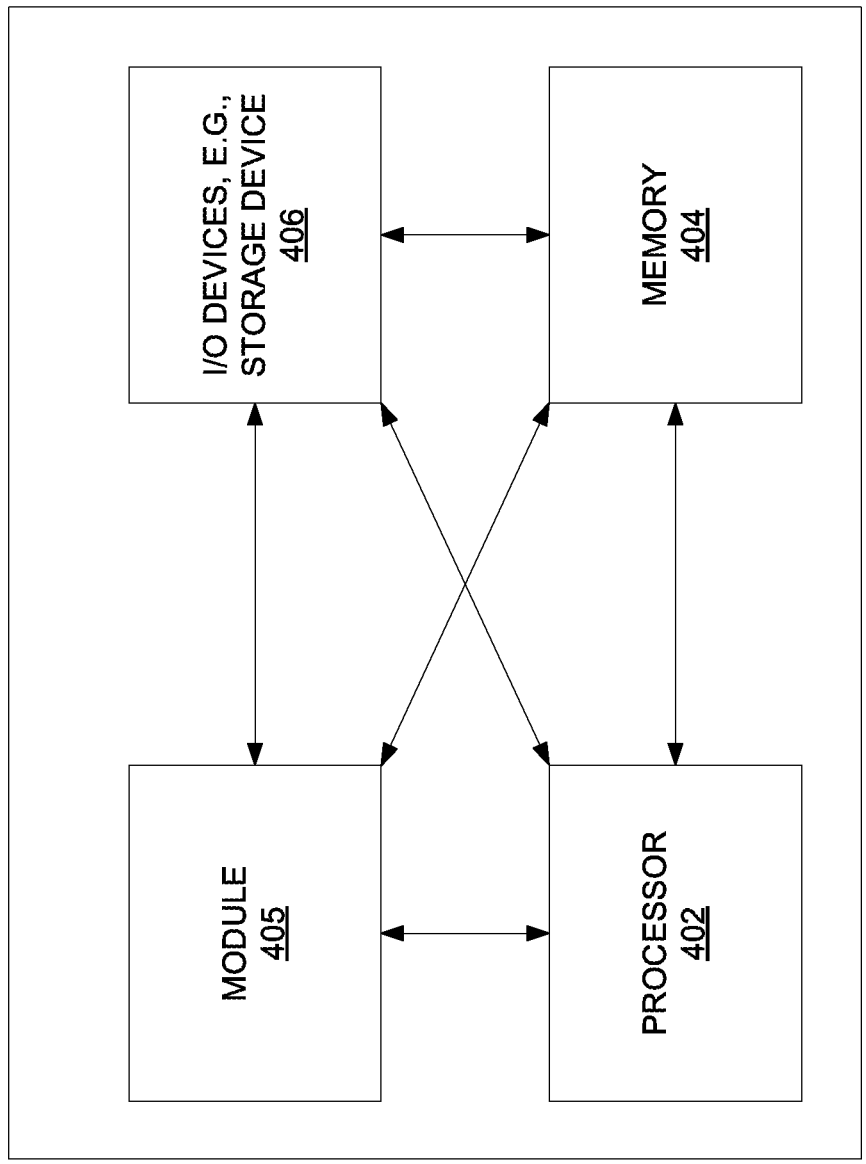
FIG. 4 illustrates a high level block diagram of a computing device specifically programmed to perform the steps, functions, blocks and/or operations described herein.

In one example, the access networks 122 may also be in communication with a server 116 and a database (DB) 118. The server 116 and DB 118 may be associated with, for example, a product manufacturer, a vendor, a corporate entity, a school, a college or university, a vocational academy, or other informational content providers (e.g., entities providing workflows for repair, configuration, installation, and/or assembly of physical items, and associated content). In accordance with the present disclosure, server 116 may comprise a computing system or server, such as computing system 400 depicted in FIG. 4, and may be configured to provide one or more operations or functions for detecting a deviation from a workflow associated with a physical item, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, DB 118 may comprise a physical storage device integrated with server 116 (e.g., a database server), or attached or coupled to the server 116, to store various types of information in support of systems for detecting a deviation from a workflow associated with a physical item, in accordance with the present disclosure. For example, DB 118 may store workflows as well as video, audio, images, text, and other media associated with various tasks of various workflows that may be managed by server 116 or provided to devices requesting workflows from server 116. DB 118 may also store records regarding deviations from workflows, including the task(s) from which the deviation(s) occurred, images, video, audio, or other media relating to a deviation, such as a photograph of a state of a physical item following the deviation, and so on, a user engaging in the deviation, a status of the user (e.g., a designated expert or a non-expert), and so forth.

To illustrate, server 116 may perform operations in accordance with the example method 300 discussed below, such as capturing a plurality of images of at least one physical item during a performance of a workflow comprising a plurality of tasks relating to the at least one physical item, tracking a progression of the performance of the workflow, and detecting, from at least a first image of the plurality of images, a deviation from the workflow. The application server 116 may also present a notification of the deviation from the workflow, confirm an action in response to the notification, and so forth. Alternatively, or in addition, server 116 may provide operations in connection with the performance of the example method 300 by another device, such as server 116 receiving a request for a workflow, providing the workflow and associated media to the requesting device, receiving and recording a notification of a deviation from the workflow, sending a query as to whether a workflow should be modified to account for a deviation, and so forth.

In one example, server 116 may retrieve a workflow and associated media from DB 118. In one example, workflows and associated media may be received by DB 118 from one or more devices of one or more experts or supervisory users who may create workflows and associated media, such as device 114. In one example, the request may be received from a user device comprising one of the device 110, device 112, or device 190 and the workflow and associated media may be provided to such a user device after server 116 assembles the workflow and associated media. The request may be received via access networks 120, access networks 122, core network 102, and/or the internet in general, and the workflow and associated media may be provided via any one or more of the same networks. For example, the workflow and associated media may be downloaded to a user device in its entirety, or may be streamed via the one or more networks. These and other aspects of the present disclosure are discussed in greater detail below in connection with the examples of FIGS. 2 and 3.

Although only a single server 116 and a single DB 118 are illustrated, it should be noted that any number of servers 116 or databases 118 may be deployed. In one example, core network 102 may also include an application server (AS) 104 and a database (DB) 106. In one example, AS 104 may perform the same or similar functions as server 116. Similarly, DB 106 may store the same or similar information as DB 118, e.g., workflows, media associated with such workflows and the tasks thereof, records regarding deviations from workflows, programs, logic, or instructions that may be executed by AS 104 for detecting a deviation from a workflow associated with a physical item (e.g., in accordance with the example method 300) and/or for performing operations in connection with the performance of the example method 300 by another device, and so forth. For instance, core network 102 may provide workflows and associated media to subscribers, e.g., in addition to television, phone, and/or other telecommunication services. In another example, core network 102 may provide workflows and associated media to network personnel, e.g., for performing repair, installation, configuration, and/or assembly of network equipment. In one example, AS 104, DB 106, server 116, and/or DB 118 may operate in a distributed and/or coordinated manner to perform various steps, functions, and/or operations described herein.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of core network 102, access networks 120 and 122, and/or the internet may comprise a content distribution network (CDN) having ingest servers, edge servers, and the like for packet-based streaming of video, audio, or other content that may be provided in connection with workflows in accordance with the present disclosure. Similarly, although only two access networks, 120 and 122 are shown, in other examples, access networks 120 and/or 122 may each comprise a plurality of different access networks that may interface with core network 102 independently or in a chained manner. For example, device 114 and server 116 may access core network 102 via different access networks, devices 110 and 112 may access core network 102 via different access networks, and so forth. Thus, these and other modifications are all contemplated within the scope of the present disclosure.

Figure 2:
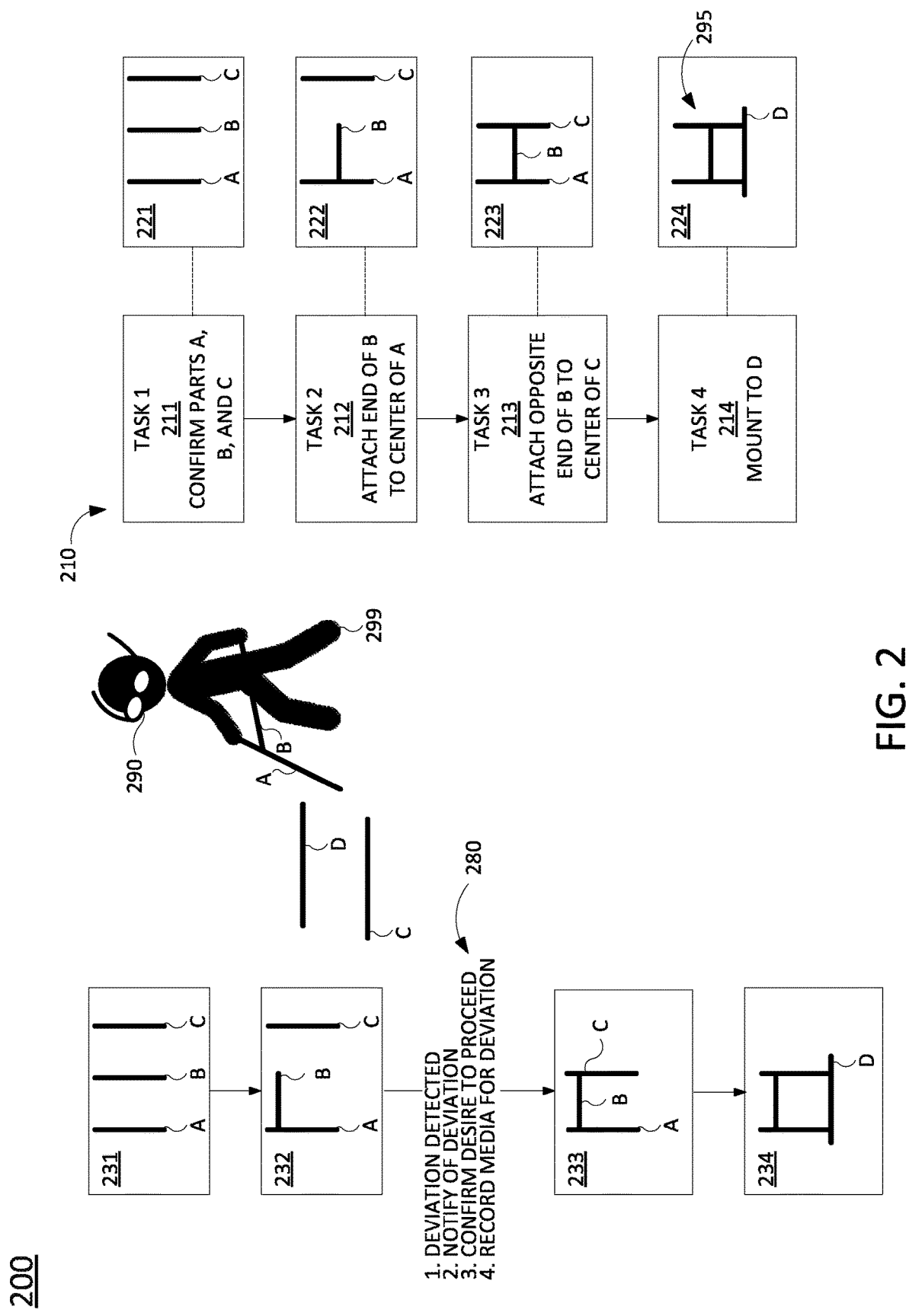
FIG. 2 illustrates an example process in accordance with the present disclosure.

FIG. 2 illustrates an example process 200 in accordance with examples of the present disclosure for detecting a deviation from a workflow associated with a physical item. As illustrated in FIG. 2, the process 200 may be for the assembly of a physical item 295. In particular, FIG. 2 illustrates workflow 210 comprising a plurality of tasks 211-214 (tasks 1-4) for the assembly of physical item 295. In addition, in the example of FIG. 2, the tasks 211-214 of workflow 210 may have a plurality of associated media, e.g., images 221-224, showing the physical item 295 at various points during the assembly. The images 221-224 may be provided by one or more users having previously performed the assembly (e.g., one or more designated experts), or automatically gathered by device(s) of the user(s) performing the assembly. The workflow 210 may be automatically created according to a workflow creation algorithm, or may be created by one or more users (e.g., one or more experts).

In the present example, a user 299 may be performing the process 200 to assemble the physical item 295. The user 299 may have a device 290 (e.g., smart glasses) that is capable of capturing images with or without corresponding audio and presenting workflows and associated media via a display, speaker, and/or audio headset. For example, the user 299 may have downloaded workflow 210 and associated images 221-224 for presentation via device 290. To illustrate, the user 299 may indicate to device 290 that he or she is beginning the process 200, e.g., through a verbal command, a gesture, or the like. The device 290 may then present the first task 211. For instance, the device may present text or audio instructions "confirm parts A, B, and C" along with image 221 presented via a display of device 290. The user 299 may then proceed to arrange parts A, B, and C. The user 299 may capture an image 231 via device 290 to confirm performance and/or completion of the first task 211. In one example, the user may provide a command to device 290 to capture the image 231. In another example, device 290 may capture images (e.g., including image 231) on an ongoing basis. In any event, device 290 may match the image 231 to the first task 211.

For instance, device 290 may apply a machine learning model comprising an image matching application to match image 231 to the image 221 associated with the first task 211. In general, the type of information to be used to match captured media with stored media associated with a task may vary from media type to media type, and from task to task. For example, for images, the relevant information may include low-level features such as colors, color distribution, standard deviation of pixel intensities, contrast, average brightness, shape/edge positions, and so forth, as well high-level semantic information such as what type of object is in the field of view of the camera, what defects are present, etc. For audio, the relevant information may include pitch, tone, intensity/loudness, specific spoken words or phrases, and so forth. Other information may include sensor information gathered from external sensors, sensors integrated within device 290, or sensors within the physical item 295 itself. These sensors are not limited to visual and auditory sensors. For example, sensors may include other visual sensing devices such as infra-red sensors, temperature sensors, weight sensors installed in the assembly area to measure the current weight of the assembled items, etc.

In one example, a machine learning model may be provided to device 290 as part of or in conjunction with workflow 210. In one example, the machine learning model may comprise a classifier, e.g., a binary classifier, a support vector machine (SVM)-based classifier, or a non-SVM-based classifier, such as a classifier based on a neural network. The classifiers may be trained upon and utilize various data points such as image shapes, color moments, color histograms, edge distribution histograms, etc., may utilize speech recognition pre-processing to obtain an audio transcript and to rely upon various keywords or phrases as data points, may utilize object recognition to determine whether detected objects are "primary" objects of a scene or are less important or background objects, and so forth.

In one example, the workflow 210 may advance to the second task 212 when it is confirmed that the first task 211 is completed. In one example, the user 299 may provide an input to indicate that the first task 211 is complete and that the workflow 210 should advance to the second task 212. Alternatively, or in addition, the device 290 may advance to the second task 212 after verifying from image 231 that the user has physically arranged parts A, B, and C as indicated in image 221, e.g., based upon a comparison of image 231 to image 221. For example, such verification may include applying a classifier (e.g., a deep learning, neural network-based classifier, or "deep neural network") to determine whether image 231 "matches" image 221 or not. For instance, image 221 may be represented as a multi-layer neural network, e.g., with each node of an input layer representing a feature that may be used for classification and with a single output, e.g., a likelihood score. In one example, features may be extracted from image 231 and input to the neural network. In one example, when the output of the neural network is greater than a threshold, it may be determined that the image 231 is a match to image 221. For instance, if the output indicates a likelihood of a match is greater than 50%, greater than 75%, etc., then it may be considered a match in accordance with the example process 200. Thus, the workflow 210 may advance to the second task 212.

It should be noted that in one example, data that may be used to train a classifier (e.g., a deep neural network) for determining task performance and/or task completion may be aggregated over multiple inputs, e.g., from a plurality of experts, from a plurality of photographs of the proper arrangement of A, B, and C taken from different angles, different lighting conditions, etc., from a plurality of negative examples, and so forth. For instance, a plurality of experts may perform the workflow 210 and generate images for each of the tasks 211-214. Thus, for example, for the first task 211, a classifier may be generated via machine learning based upon the aggregation of images from the plurality of experts (e.g., by averaging of features extracted from such images, by training and retraining the classifier with each positive or negative example, and so forth). To illustrate, various experts may generally arrange parts A, B, and C in a row, but there may be slight variations in the arrangements. By training a classifier using a plurality of images from a plurality of users, such a classifier may be more accurate in assessing that the user 299 has adequately, arranged parts A, B, and C in accordance with the first task 211.

The process 200 may similarly continue with regard to the second task 212 ("attach end of B to center of A"), the third task 213 ("attach opposite end of B to center of C"), and the fourth task 214 ("mount to D"). For instance, for each task 212-214, the device 290 may similarly present text or audio instructions along with images 222-224, capture images 232-234, compare the captured images 232-234 to stored images 222-224, respectively, or to a classifier that is trained, at least in part, upon images 222-224, respectively. However, in the present example, when performing the second task 212, user 299 may install part B closer to one of the ends of part A, rather than in the center of part A as indicated in the instructions for the second task 212 and in image 222. In addition, this deviation may be captured in image 232 by a camera of device 290. In one example, the deviation may be detected by device 290 comparing image 232 to image 222 and/or applying a classifier associated with task 212 to image 232 and determining that there is not a match. In one example, device 290 may then notify the user of the deviation, e.g., via audio and/or textual warning, via a reminder by again presenting image 222 for reference via a display of device 290, and so forth.

In one example, user 299 may realize a mistake has been made, correct the mistake, and cause device 290 to capture a new image which may show correct completion of the second task 212. However, for illustrative purposes FIG. 2 shows an example where user 299 explicitly chooses to disregard or override the warning. In one example, the user 299 may be a designated expert. In another example, the user may be a non-expert, but may choose to proceed without complying with the second task 212 for some other reasons. For instance, the user 299 may encounter an unforeseen condition that was not taken into account when one or more experts or an automated system created the workflow 210. In one example, device 290 may record the circumstances of the deviation, such as storing the image 232 and any subsequent images (e.g., images 233 and 234) as the user 299 continues along with the process 200. In one example, device 290 may transmit the information regarding the deviation to a centralized device for later presentation to a system administrator, for aggregation with information regarding deviations of other experts and/or non-experts using the workflow 210, and so on. In one example, if user 299 is a designated expert, device 290 may present a query to user 299 as to whether the workflow 210 should be modified to account for the deviation, whether a new workflow should be created (forked) to account for different circumstances that are not addressed by the current workflow 210, and so on.

In the present example, user 299 may confirm a desire to proceed with the deviation because an obstruction may be present at a location where the physical item 295 may be deployed. Thus, for example, there may be insufficient height clearance if part B were attached to the center of part A. Accordingly, the user 299 may attach the opposite end of part B nearer to one of the ends of part C (rather than in the center of part C, as indicated in the instructions for the third task 213). In addition, device 290 may capture the image 233 showing this arrangement. The user 299 may then mount the assembled parts A, B, and C into part D and capture an image 234 showing this arrangement.

In one example, image 233 and image 234 may be associated with the third task 213 and the fourth task 214, respectively. For instance, the manner in which the user 299 has assembled the physical item 295 may be used to expand tasks 2, 3, and 4 to more broadly account for the deviation along with the originally intended arrangement of parts A, B, and C. However, in another example, images 233 and 234 may be associated with new tasks that may represent a new branch of the workflow 210 that may parallel tasks 212-214, or tasks for a new workflow to be created. The new branch may be automatically generated or may be created by a designated expert, a supervisory user, etc.

It should be noted that the example process of FIG. 2 is just one example of how a workflow may be performed by a user and processed by one or more devices for detecting a deviation from a workflow associated with a physical item, in accordance with the present disclosure. For instance, in other, further, and different examples, multiple images or other media may be associated with each task and may be presented to a user in connection with the performance of such tasks, a workflow may have a greater complexity, such as multiple alternative branches; tasks with non-fixed orders of performance, and discretionary or optional tasks, additional information may be used to verify task completion, such as sensor data gathered by device 290, data gathered by physical item 295 (e.g., if physical item 295 is equipped for wired and/or wireless communication and further includes a sensor for measuring aspects of an environment or an internal monitoring unit for monitoring parameters of the physical item 295, such as a memory utilization, a processor utilization, etc.), sensor data gathered by an independent sensor device, and so forth. In general, the types of data used to confirm task completion may vary depending upon the type of physical object, the capabilities of the device of the user, the types of media available in connection with a workflow, the type of task, and so on. Thus, these and other modifications are all contemplated within the scope of the present disclosure.

Figure 3:
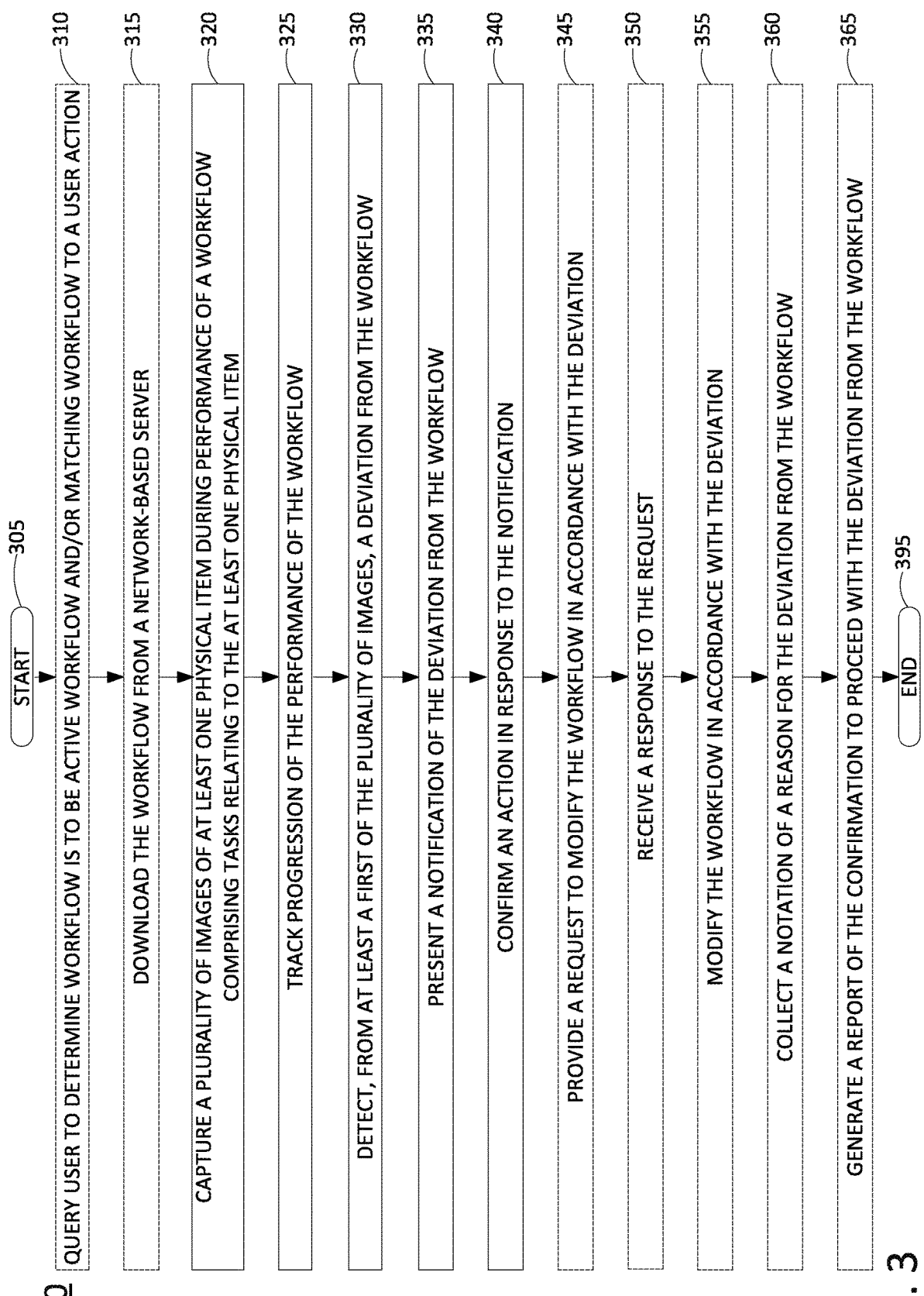
FIG. 3 illustrates a flowchart of an example method for detecting a deviation from a workflow associated with a physical item.

FIG. 3 illustrates a flowchart of an example method 300 for detecting a deviation from a workflow associated with a physical item, in accordance with the present disclosure. In one example, the method 300 is performed by a component of the system 100 of FIG. 1, such as by one of the device 112, device 190, and/or any one or more components thereof (e.g., a processor, or processors, performing operations stored in and loaded from a memory), or by one of device 112 and/or the device 190, in conjunction with one or more other devices, such as server 116, AS 104, DB 106, DB 118, sensor 197, physical item 195, and so forth. In another example, the method 300 is performed entirely or primarily by a network-based component of the system 100 of FIG. 1, such as by one of the server 116, application server 104, and/or any one or more components thereof (e.g., a processor, or processors, performing operations stored in and loaded from a memory), or by one of the server 116 or application server 104, in conjunction with one or more other devices, such as DB 106, DB 118, device 112, device 190, sensor 197, physical item 195, and so forth. In one example, the steps, functions, or operations of method 300 may be performed by a computing device or system 400, and/or processor 402 as described in connection with FIG. 4 below. For instance, the computing device or system 400 may represent any one or more components of a user device, such as device 112 and/or device 190, or a network-based device, such as server 116 and/or application server 104 in FIG. 1 that is/are configured to perform the steps, functions, and/or operations of the method 300. Similarly, in one example, the steps, functions, and/or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processor, such as processor 402. The method 300 begins in step 305 and proceeds to optional step 310, optional step 315, or step 320.

At optional step 310, the processor may query a user to determine a workflow is to be an active workflow or may match the workflow to an action of a user. In one example, the workflow may be one of a plurality of workflows associated with at least one physical item. In one example, the query may be presented via a user device that includes the processor, or may be presented via a user device that is in communication with the processor via a session for a performance of a workflow (e.g., when the processor is deployed in a network-based server). In one example, the processor may determine the at least one physical item via photographs or video of the at least one physical item captured via a camera of a user device including the processor or a user device in communication with the processor. In another example, the processor may determine the at least one physical item by a user scanning a barcode, a quick response (QR) code, or the like from a packaging of the at least one physical item or from the physical item itself. The workflow may comprise, for example, a repair process for the at least one physical item, a configuration process for the at least one physical item, an installation process for the at least one physical item, or an assembly process for the at least one physical item.

At optional step 315, the processor may download the workflow from a network-based server. For instance, optional step 315 may be performed in an example where the processor is a processor of a user device and where the network-based server stores a plurality of workflows relating to the at least one physical item. In one example, optional step 315 may further include downloading media associated with various tasks of the workflow, such as as video, audio, images, text, and other media.

At step 320, the processor captures a plurality of images of the at least one physical item during a performance of the workflow. For example, the processor may be deployed in a user device that includes one or more cameras for capturing images (including still images and/or video) from an environment, or may be in communication with and receive the at least one image from such a user device. In one example, step 325 may further include capturing additional data relating to the at least one physical item, such as audio data, other sensor data, such as temperature data, humidity data, etc., operational data of the at least one physical item (e.g., where the at least one physical item comprises an electronic device that is equipped for wired communications, cellular and/or non-cellular wireless communication, and so forth).

At step 325, the processor tracks a progression of the performance of the workflow. For instance, the workflow may comprise a plurality of tasks relating to the at least one physical item. In one example, step 320 may include receiving an input signal indicating a change between tasks in the workflow. In one example, tracking the progression of the performance of the workflow may include comparing at least one of the plurality of images that is captured to at least one expected image of the at least one physical item for a task in the workflow, and determining that the task of the workflow is in progress or is completed based upon the comparing. For instance, the at least one of the plurality of images may comprise a single image (photo), multiple images (photos), or a video. In one example, the at least one expected image is captured from a designated expert performing the workflow at an earlier time. For instance, for a given task, or tasks, instructional media, such as video, audio, images, text, etc. may be collected and stored in connection with the task(s).

In one example, the tracking the progression of the performance of the workflow may include collecting sensor information from the at least one physical item or from an environment of the at least one physical item, comparing the sensor information that is collected to expected sensor information for a task in the workflow, and determining that the task of the workflow is in progress or is completed based upon the comparing. For instance, the expected sensor information may be captured from a designated expert performing the workflow in a similar manner to instructional media associated with one or more tasks of the workflow.

At step 330, the processor detects, from at least one of the plurality of images, a deviation from the workflow. For instance, detecting the deviation from the workflow may include comparing at least one of the plurality of images captured at step 320 to an expected image for the task, and determining that the at least one image does not match the expected image. In one example, the determination of a "match" or a non-match may be quantified via a classifier, e.g., a binary classifier, a neural network-based classifier, a support vector machine (SVM)-based classifier, and so on. In one example, such a classifier may account for other features in addition to those which may be derived from image data, such as audio data, sensor data, and so forth, as described above.

At step 335, the processor presents a notification of the deviation from the workflow. The notification may be presented visually via a display of a user device that includes the processor or that is in communication with the processor, may be presented as an audio notification via a speaker or headset of the user device, or attached to or in communication with the user device, and so forth.

At step 340, the processor confirms an action in response to the notification. For instance, the confirming the action in response to the notification may include detecting a correction of the deviation from the workflow or receiving a confirmation to proceed with the deviation from the workflow. The detecting the correction of the deviation from the workflow may include capturing at least one additional image, comparing the at least one additional image to an expected image for the task, and determining that the additional image matches the expected image. For instance, the comparison may indicate that the physical item is now arranged correctly in accordance with the task. On the other hand, if the processor receives confirmation to proceed with the deviation from the workflow, the confirmation may comprise an explicit input from the user via a voice command, a gesture or screen input via a user application associated with the performance of the workflow, and so forth.

At optional step 345, the processor may provide a request to modify the workflow in accordance with the deviation. In one example, the request to modify the workflow is provided when a user performing the workflow is a designated expert. For example, step 340 may include receiving a confirmation to proceed with a deviation. In one example, the request provided at optional step 345 may be presented visually via a display of a user device that includes the processor or that is in communication with the processor, may be presented in an audio format via a speaker or headset of the user device, or attached to or in communication with the user device, and so forth. In one example, the request may include a plurality of options such as expanding a task, inserting a new task, replacing an existing task with a new task, and so forth. In another example, one or more options may be presented depending upon the context of the type of deviation.

At optional step 350, the processor may receive a response to the request. For instance, the response may authorize the workflow to be modified in accordance with the deviation, or may instead deny the request. The response may be provided via a user device of the user via a voice command, a gesture or screen input via a user application associated with the performance of the workflow, and so forth.

At optional step 355, the processor may modify the workflow in accordance with the deviation, when the response authorizes the workflow to be modified in accordance with the deviation. In one example, modifying the workflow may include storing the at least one image for at least one task of the workflow. For example, the processor may add the at least one task of the workflow as a new task, or may modify an existing task of the workflow. In either case, the processor may store the at least one image as associated data (e.g., as new instructional data) related to the at least one task.

At optional step 360, the processor may collect a notation of a reason for the deviation from the workflow. In one example, the notation may be collected regardless of whether the user is a designated expert or a non-expert. In one example, the notation may be provided via a user device of the user via a voice command, a gesture or screen input via a user application associated with the performance of the workflow, and so forth. The notation may comprise, for example a keyword or phrase, a sentence, or explanatory paragraph relating to a reason for the deviation. In one example, the processor may provide suggested reasons for a user to select. For instance, where at least one other user may have engaged in a same or similar deviation, the processor may have previously recorded a reason for the deviation. In addition, the present user may prefer to select a same reason as the reason for the deviation that is detected at step 330. To illustrate, instead of recording the reasons for the deviations as "poor connection" and "network issues," respectively, the user providing the notation at optional step 360 may realize the present issue driving the deviation is the same as for the previous user and instead select the reason as "poor connection." Thus, it may be made apparent to the processor that at least two users have deviated from the workflow due the same type of issue.

At optional step 365, the processor may generate a report of the confirmation to proceed with the deviation from the workflow. In one example, the report may include the notation of the reason. For instance, even where a user is not designated as an expert, if the user deviates from the workflow due to an unexpected condition that was not contemplated when the workflow was created, one or more designated experts may agree that the user was correct to deviate from the workflow in response to the given condition. The non-expert user may not be provided with privileges to cause a workflow to be modified. However, where one or more designated experts, a supervisory user, or the like may receive and review the notation, one or more of such users may eventually authorize the modification of the workflow. In one example, the report may include a number of instances of a same deviation from the workflow. For instance, where a plurality of non-experts users make the same or similar deviation(s) from the workflow, supervisory users, designated experts, or the like may be better informed that there may be a potential issue that affects multiple users and may realize that the current workflow may be inadequate to address a certain condition.

Following step 340, or one of optional steps 345-365 the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the method 300 may also include storing the report, sending/transmitting the report to a supervisor, and so on. In one example, the method 300 may further include receiving a change to the workflow from a supervisor based upon the report, e.g., after the supervisor reviews the report and decides that a change is warranted. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for detecting a deviation from a workflow associated with a physical item, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computing devices. For example, when the present method(s) are implemented in a distributed or parallel manner, any one or more steps of the present method(s) can be implemented by any one or more of the multiple or parallel computing devices of the processing system. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for detecting a deviation from a workflow associated with a physical item (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for detecting a deviation from a workflow associated with a physical item (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A device comprising:
 a processing system including at least one processor; and
 a computer-readable medium storing instructions which, when executed by the processing system, cause the processing system to perform operations, the operations comprising:
 capturing a plurality of images of at least one physical item during a performance of a workflow comprising a plurality of tasks relating to the at least one physical item;
 tracking a progression of the performance of the workflow, wherein the tracking the progression of the performance of the workflow comprises:
 collecting sensor information from the at least one physical item;

comparing the sensor information that is collected to expected sensor information for an additional task of the plurality of tasks in the workflow; and determining that the additional task is in progress or is completed based upon the comparing;

detecting, from at least a first image of the plurality of images, a deviation from the workflow, wherein the detecting the deviation comprises applying the at least the first image to a deep neural network classifier representing at least a first expected image of the at least one physical item for one of the plurality of tasks, wherein the deep neural network classifier outputs at least a first value indicative of a matching between the at least the first image and the at least the first expected image, wherein the deviation from the workflow is detected when the at least the first value is less than a threshold value, wherein the deep neural network classifier is trained in accordance with the at least the first expected image that is captured in connection with at least one positive example performance of the workflow;

presenting a notification of the deviation from the workflow; and confirming an action in response to the notification.

2. The device of claim 1, wherein the operations further comprise:

providing a request to modify the workflow in accordance with the deviation; and receiving a response to the request, the response authorizing the workflow to be modified in accordance with the deviation or denying the request.

3. The device of claim 2, wherein the request to modify the workflow is provided when a user performing the workflow is a designated expert.

4. The device of claim 2, wherein the operations further comprise:

modifying the workflow in accordance with the deviation, when the response authorizes the workflow to be modified in accordance with the deviation.

5. The device of claim 4, wherein the modifying the workflow comprises:

storing the at least the first image of the plurality of images for the one of the plurality of tasks or a new task of the workflow.

6. The device of claim 1, wherein the confirming the action in response to the notification comprises:

detecting a correction of the deviation from the workflow; or receiving a confirmation to proceed with the deviation from the workflow.

7. The device of claim 6, wherein the operations further comprise:

collecting a notation of a reason for the deviation from the workflow.

8. The device of claim 6, wherein the operations further comprise:

generating a report of the confirmation to proceed with the deviation from the workflow.

9. The device of claim 8, wherein the report includes a number of instances of a same deviation from the workflow.

10. The device of claim 1, wherein the tracking the progression of the performance of the workflow further comprises:

comparing at least a second image of the plurality of images that is captured to at least a second expected image of the at least one physical item for the additional task of the plurality of tasks in the workflow; and determining that the additional task of the workflow is in progress or is completed based upon the comparing.

11. The device of claim 10, wherein the at least the first expected image and the at least the second expected image are captured from a designated expert performing the workflow.

12. The device of claim 1, wherein the tracking the progression of the performance of the workflow further comprises:

receiving an input signal indicating a change between the plurality of tasks in the workflow.

13. The device of claim 1, wherein the expected sensor information is captured from a designated expert performing the workflow.

14. The device of claim 1, wherein the workflow comprises:

a repair process for the at least one physical item;
a configuration process for the at least one physical item;
an installation process for the at least one physical item; or
an assembly process for the at least one physical item.

15. The device of claim 1, wherein the operations further comprise:

matching the workflow to an action of a user, wherein the workflow is one of a plurality of workflows associated with the at least one physical item.

16. The device of claim 1, wherein the operations further comprise:

downloading the workflow from a network-based server.

17. The device of claim 1, wherein the operations further comprise:

querying a user to determine the workflow is to be an active workflow.

18. A non-transitory computer-readable medium storing instructions which, when executed by a processing system including at least one processor, cause the processing system to perform operations, the operations comprising:

capturing a plurality of images of at least one physical item during a performance of a workflow comprising a plurality of tasks relating to the at least one physical item;

tracking a progression of the performance of the workflow, wherein the tracking the progression of the performance of the workflow comprises:

collecting sensor information from the at least one physical item;

comparing the sensor information that is collected to expected sensor information for an additional task of the plurality of tasks in the workflow; and determining that the additional task is in progress or is completed based upon the comparing;

detecting, from at least a first image of the plurality of images, a deviation from the workflow, wherein the detecting the deviation comprises applying the at least the first image to a deep neural network classifier representing at least a first expected image of the at least one physical item for one of the plurality of tasks, wherein the deep neural network classifier outputs at least a first value indicative of a matching between the at least the first image and the at least the first expected image, wherein the deviation from the workflow is detected when the at least the first value is less than a threshold value, wherein the deep neural network classifier is trained in accordance with the at least the first expected image that is captured in connection with at least one positive example performance of the workflow;

presenting a notification of the deviation from the workflow; and confirming an action in response to the notification.

19. A method comprising:

capturing, by a processing system including at least one processor, a plurality of images of at least one physical item during a performance of a workflow comprising a plurality of tasks relating to the at least one physical item;

tracking, by the processing system, a progression of the performance of the workflow, wherein the tracking the progression of the performance of the workflow comprises:

collecting sensor information from the at least one physical item;

comparing the sensor information that is collected to expected sensor information for an additional task of the plurality of tasks in the workflow; and determining that the additional task is in progress or is completed based upon the comparing;

detecting, by the processing system from at least a first image of the plurality of images, a deviation from the workflow, wherein the detecting the deviation comprises applying the at least the first image to a deep neural network classifier representing at least a first expected image of the at least one physical item for one of the plurality of tasks, wherein the deep neural network classifier outputs at least a first value indicative of a matching between the at least the first image and the at least the first expected image, wherein the deviation from the workflow is detected when the at least the first value is less than a threshold value, wherein the deep neural network classifier is trained in accordance with the at least the first expected image that is captured in connection with at least one positive example performance of the workflow;

presenting, by the processing system, a notification of the deviation from the workflow; and confirming, by the processing system, an action in response to the notification.

20. The method of claim 19, further comprising:

providing, by the processing system, a request to modify the workflow in accordance with the deviation; and receiving, by the processing system, a response to the request, the response authorizing the workflow to be modified in accordance with the deviation or denying the request.

* * * * *